(12) United States Patent
Bird et al.

(10) Patent No.: US 9,063,795 B2
(45) Date of Patent: Jun. 23, 2015

(54) ADAPTIVE RESOURCE USAGE LIMITS FOR WORKLOAD MANAGEMENT

(71) Applicant: International Business Machines Corporation, Armonk, NY (US)

(72) Inventors: Paul M. Bird, Ontario (CA); David Kalmuk, Ontario (CA); Stephen Rees, Ontario (CA); Scott D. Walkty, Ontario (CA)

(73) Assignee: International Business Machines Corporation, Armonk, NY (US)

(*) Notice: Subject to any disclaimer, the term of this patent is extended or adjusted under 35 U.S.C. 154(b) by 192 days.

(21) Appl. No.: 13/719,415

(22) Filed: Dec. 19, 2012

(65) Prior Publication Data

US 2014/0173616 A1 Jun. 19, 2014

(51) Int. Cl.
*G06F 9/46* (2006.01)
*G06F 15/173* (2006.01)
*G06F 9/50* (2006.01)

(52) U.S. Cl.
CPC ............... *G06F 9/5083* (2013.01); *G06F 9/50* (2013.01); *G06F 9/5027* (2013.01); *G06F 2209/504* (2013.01); *Y02B 60/142* (2013.01)

(58) Field of Classification Search
None
See application file for complete search history.

(56) References Cited

U.S. PATENT DOCUMENTS

| | | | |
|---|---|---|---|
| 5,913,067 A | 6/1999 | Klein | |
| 6,430,592 B1* | 8/2002 | Davison | 718/103 |
| 6,438,704 B1* | 8/2002 | Harris et al. | 713/502 |
| 7,484,111 B2 | 1/2009 | Fung | |
| 2004/0021678 A1* | 2/2004 | Ullah et al. | 345/700 |
| 2006/0218279 A1* | 9/2006 | Yamaguchi et al. | 709/226 |
| 2008/0022284 A1* | 1/2008 | Cherkasova et al. | 718/104 |
| 2008/0263559 A1* | 10/2008 | Das et al. | 718/104 |
| 2009/0037922 A1* | 2/2009 | Herington | 718/104 |
| 2009/0235268 A1* | 9/2009 | Seidman et al. | 718/104 |
| 2011/0246596 A1* | 10/2011 | Cao et al. | 709/208 |
| 2012/0227054 A1 | 9/2012 | Jackson | |
| 2014/0026144 A1* | 1/2014 | Pack | 718/105 |

OTHER PUBLICATIONS

Evangelia Kalyvianaki et al., "Self-Adaptive and Self-Configured CPU Resource Provisioning for Virtualized Servers Using Kalman Filters"; ICAC'09, Jun. 15-19, 2009, Barcelona, Spain; 10 pages.
Michael Floyd et al., "Adaptive Energy Management Featuresof the POWER7TMProcessor", Hot Chips Aug. 22-23, 2010; 18 pages.
Wu et al., "Development of an Adaptive Workload Management System using Queueing Network-Model of Human Processor", The 51st Annual Conference of the Human Factors and Ergonomics Society, Baltimore, MD, Feb. 12, 2007, 4 pages.

* cited by examiner

*Primary Examiner* — Adam Lee
(74) *Attorney, Agent, or Firm* — Terry Carroll; Edell, Shapiro & Finnan, LLC

(57) ABSTRACT

According to an embodiment of the present invention, a system assigns at least one workload a hard share quantity and at least one other workload a soft share quantity or a hard share quantity. The system allocates a resource to the workloads based on the hard share quantity and the soft share quantity of active workloads in a predefined interval. A hard share quantity indicates a maximum resource allocation and a soft share quantity enables allocation of additional available processor time. Embodiments of the present invention further include a method and computer program product for allocating a resource to workloads in substantially the same manner as described above.

16 Claims, 12 Drawing Sheets

```
if (usingHardShares)
{
  if (isActive)
  {
    hardSharesLimit = (shares * 100) / sumActiveShares;
  }
  else
  {
    // Note that the else condition here is an optional limit we can choose
        // to apply on inactive workloads. An embodiment might want to do that
        // to ensure that if a workload suddenly becomes active it is not free
        // to consume as much CPU as it wants until the next time the scheduler // thread kicks in.
    hardSharesLimit = (shares * 100) / (sumActiveShares + shares);
  }
}
else
{
  hardSharesLimit = NONE;
}
```

FIG.9

FOR SERVICE SUPERCLASSES:

```
if (usingHardShares)
{
  if (isActive)
  {
    hardSharesLimit = (shares * 100) / sumActiveSuperclassShares;
  }
  else
  {
    // Note that the else condition here is an optional limit we can choose
    //         to apply on inactive workloads. An embodiment might want to do that
    //         to ensure that if a workload suddenly becomes active it is not free
    //         to consume as much CPU as it wants until the next time the scheduler
    //         thread kicks in.
    hardSharesLimit = (shares * 100) / (sumActiveSuperclassShares + shares);
  }
}
else
{
  hardSharesLimit = NONE;
}
```

FIG.10

FOR SERVICE SUBCLASSES:

```
if (usingHardShares)
{
  if (isActive)
  {
    // Compute the cpu utilization of the parent superclass
    x = cpuUtil of parent superclass // Compute the entitled cpu utilization of the parent superclass based on its
    // shares
    y = (shares of parent superclass * 100) / sumActiveSuperclassShares // The subclass hard shares limit is based on the % entitlement of the
    // subclass compared to other active subclasses in the same superclass,
    // as a percentage of the greater of either the entitled cpu utilization
    // of the parent superclass, or the actual cpu utilization in the parent
    // superclass (which might be larger if the superclass is configured with
    // soft shares)
    hardSharesLimit = (((shares * 100) / sumActiveSubclassShares) * MAX(x,y)) / 100
  }
  else
  {
    // Note that the else condition here is an optional limit we can choose to apply
    // on inactive workloads. An embodiment might want to do that to ensure
    // that if a workload suddenly becomes active it is not free to consume as much
    // CPU as it wants until the next time the scheduler thread kicks in.
```

FIG.11

```
// Compute the cpu utilization of the parent superclass
x = cpuUtil of parent superclass // Compute the entitled cpu utilization of the parent superclass
if (parent superclass isActive)
{
   y = (shares of parent superclass * 100) / sumActiveSuperclassShares
}
else
{
     y = (shares of parent superclass * 100)
      / (sumActiveSuperclassShares + shares of parent superclass)
}

// Hard shares limit is based on the % entitlement of the subclass compared to
// other active subclasses in the same superclass, as a percentage of the greater
// of either the entitled cpu utilization of the parent superclass, or the actual
// cpu utilization in the parent superclass (which could be larger if the
// superclass is configured with soft shares)
   hardSharesLimit = (((shares * 100) / sumActiveSubclassShares) * MAX(x,y)) / 100
  }
}
else
{
  hardSharesLimit = NONE;
}
```

FIG.11 CONTINUED

ADAPTIVE RESOURCE USAGE LIMITS FOR WORKLOAD MANAGEMENT

BACKGROUND

1. Technical Field

Present invention embodiments relate to workload management, and more specifically, to adaptive resource usage limits for workload management.

2. Discussion of the Related Art

In an environment where multiple distinct workloads or applications run on a large scale server system (such as an enterprise database server), one aspect of protecting high priority work from the impact of resource-intensive lower priority work is managing the allocation of resource (e.g., processor time, network time, Input/Output capacity (I/O), etc.) between the different workloads on the server. Some general operating system workload managers and some specific processor management capabilities built into middleware server products (e.g., database servers) allow a user to exert direct control over the amount of a resource given to different workloads running on the system. These workload managers commonly offer users the ability to set three types of controls: resource shares, soft limits, and hard limits. By way of example, resource shares for processor time are referred to as CPU shares. CPU shares and soft limits allow lower priority work to use available processor cycles but do not effectively protect high priority work in all circumstances, while hard limits can protect high priority work but impede full utilization of the system's resources.

BRIEF SUMMARY

According to an embodiment of the present invention, a system assigns at least one workload a hard share quantity and at least one other workload a soft share quantity or a hard share quantity. The system allocates a resource to the workloads based on the hard share quantity and the soft share quantity of active workloads in a predefined interval. A hard share quantity indicates a maximum resource allocation and a soft share quantity enables allocation of additional available processor time. Embodiments of the present invention further include a method and computer program product for allocating a resource to workloads in substantially the same manner as described above.

BRIEF DESCRIPTION OF THE SEVERAL VIEWS OF THE DRAWINGS

Generally, like reference numerals in the various figures designate like components.

FIG. 9 is a pseudo code description of a manner of determining a hard shares limit for a workload according to an embodiment of the present invention.

FIG. 10 is a pseudo code description of a manner of determining a hard shares limit for a superclass of workloads according to an embodiment of the present invention.

FIG. 11 is a pseudo code description of a manner of determining a hard shares limit for a subclass of workloads according to an embodiment of the present invention.

DETAILED DESCRIPTION

Figure 1:
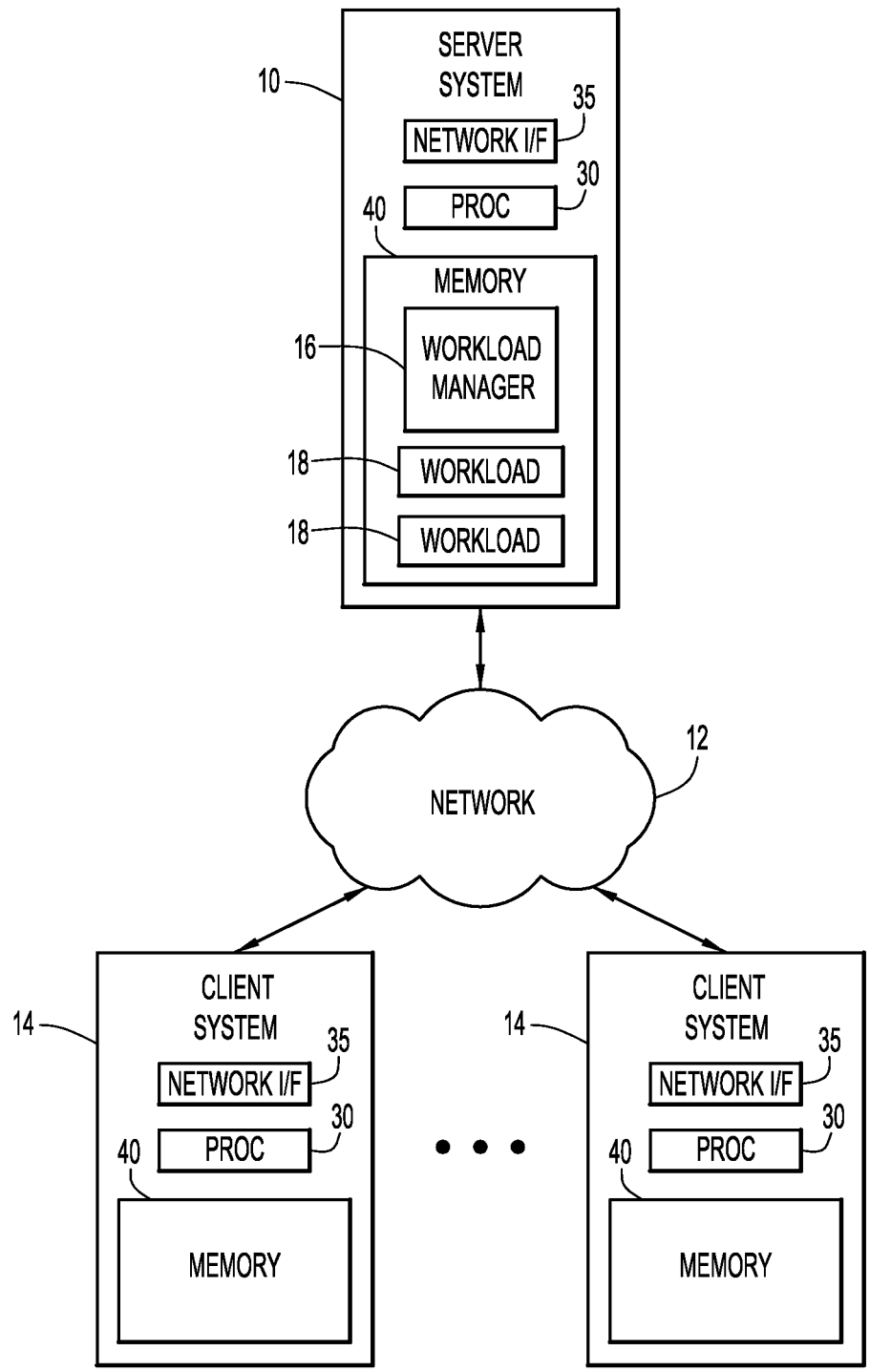
FIG. 1 is a diagrammatic illustration of a computing environment for an embodiment of the present invention.

Present invention embodiments relate to managing the allocation of a resource (e.g., processor time, network time, I/O, etc.) between workloads on a computer system. An adaptive resource usage limit provides the protection of high priority work afforded by "hard limits" and flexibility and resource efficiency similar to that of "resource shares" and "soft limits."

By way of example, in the case of processor time, resource shares, or "CPU shares," allow a user to define the target processor time allocation for a workload in terms of a numeric share value that represents the relative proportion of processor time the workload should receive compared to other workloads on the system. As an example, if Workload A is assigned 400 shares, Workload B is assigned 400 shares, and Workload C is assigned 200 shares, the relative allocation of processor time between the three workloads would be 40% for Workload A, 40% for Workload B, and 20% for Workload C (400, 400, and 200 out of 1000 shares total respectively). If only Workload A and B are running the target allocation would be 50% use of the processor for each workload, since each represents 400 shares out of a total 800. When the workloads running on the system are competing for processor time a workload manager will ensure that the processor time is assigned based on the target allocation determined by the shares. When the system is not fully utilized and workloads are not competing for processor time, workloads are allowed to consume the idle capacity as needed.

In general, the concept of shares offers an appealing and flexible model for managing the processor time assigned to different workloads because the share based allocations are always relative to other workloads running on the system, meaning that the allocations grow or shrink depending on how many active workloads are running. Allowing workloads access to idle processor capacity in the absence of competition for processor time provides for efficient use of machine resources.

However, testing has shown that CPU shares are largely ineffective in limiting the impact of intensive workloads on higher priority work in situations where the processor time is not fully utilized or is not under competition. The reason is that a high intensity workload may affect or impede the progress of another workload even when sufficient processor capacity is available for both workloads. This occurs because processor time is not the only resource under contention; given additional processor cycles, the high intensity workload can impede the higher priority workload through I/O contention, network contention, CPU cache impacts, or other secondary effects. In a server system like a database that typically does not run at full processor utilization but may run jobs that involve significant I/O, CPU shares are therefore not an effective workload management mechanism for achieving general workload insulation.

"Soft limits" behave in a similar manner to CPU shares, except that the CPU allocations for workloads are specified as a fixed percentage of the machine resources, rather than as a relative share. Workloads are allowed to exceed soft limits when the CPU is not fully utilized and they therefore have similar limitations to CPU shares in terms of their effectiveness as a workload management mechanism in environments where the CPU is not being run at full utilization.

"Hard limits" provide the capability for the user to specify a strict processor usage consumption limit for a workload, specified as a percentage of the overall processor capacity available on the computer system. Testing has shown that hard limits are effective in limiting the impact of intensive workloads on higher priority work both in situations where the processor time is fully utilized and when it is under-utilized. In some database systems, hard limits are the main processor time management mechanism recommended for workload management. However, hard limits are not adaptive to changes in the workloads running on the system. If an intensive (lower priority) workload is the only workload running on the system it will still be limited, causing it to run much more slowly than it technically has to. In an environment where the number of different workloads can vary greatly it can also be difficult to pick a fixed limit that is appropriate for the different combinations of work running on the system.

More adaptive versions of hard limits that can offer reliable insulation with the flexibility to adapt to the ebb and flow of workloads on the system tend to be complicated and difficult to implement in practice. In experiments, one approach explored was to devise scripts to monitor the processor time consumption of two workloads on a continuing basis and increase or decrease hard limits configured on the intensive workload dynamically based on the relative processor utilization of the higher priority workload up to a fixed maximum. In the test environment this approach provided both adequate workload isolation, and also allowed more efficient use of system resources, but this type of script is highly customized so it would be difficult for users to tune for their own environments, and it cannot be easily extended to more diverse or complex environments that involve more than two separate workloads at a time.

A possible alternative is to apply hard limits conditionally based on a minimum amount of processor utilization. But this too would be difficult to configure in an environment that ran a varied number of workloads, which might again necessitate manual scripting in order to adjust the configuration based on a combination of monitoring data and/or expected workloads at particular times of day, significantly adding to the complexity of configuring a stable environment.

Present invention embodiments provide a convenient mechanism for applying adaptive hard limits to workloads on a computer system. This mechanism extends the existing concept of dividing the available host processor time between workloads based on "shares", by introducing two new categories of shares: "soft shares", and "hard shares".

An example computing environment for a present invention embodiment is illustrated in FIG. 1. Specifically, the environment includes one or more server systems 10 and one or more client or end-user systems 14. Server systems 10 and client systems 14 may be remote from each other and communicate over a network 12.

Network 12 may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

A server system includes a workload manager module 16 and runs workloads 18. The workload manager controls allocation of processor time among workloads. The term "workload" is used here to represent a generic grouping of jobs submitted by one or more applications on the system. Another common term used in the workload management domain for a workload is "service class". Each workload may include interactive and batch jobs associated with any number of users. The workload manager and workloads may be distributed across plural server systems or other systems in communication with the server system.

Client systems 14 enable users to initiate jobs belonging to a workload. The client systems may present any graphical user (e.g., GUI, etc.) or other interface (e.g., command line prompts, menu screens, etc.) to receive commands from users and communicate with the workload manager, workload jobs, and other modules or services.

Server systems 10 and client systems 14 may be implemented by any conventional or other computer systems preferably equipped with a display or monitor, a base (e.g., including at least one processor 30, memories 40 and/or internal or external network interface or communications devices 35 (e.g., modem, network cards, etc.)), optional input devices (e.g., a keyboard, mouse, or other input device), and any commercially available and custom software (e.g., workload manager, workload applications, etc.). Server system 10 may include any number of processors and workloads.

Workload manager 16 may include one or more modules or units to perform the various functions of present invention embodiments described below (e.g., collecting processor usage metrics, determining processor usage limits, applying processor usage limits, etc.) may be implemented by any combination of any quantity of software and/or hardware modules or units, and may reside within memory 40 of the server and/or client systems for execution by processor 30. In particular, workload manager 16 has the capability to apply "hard limits" and either or both of "CPU shares" and "soft limits." Furthermore, the workload manager implements the concept of "soft shares" and "hard shares" according to an embodiment of the present invention.

"Soft shares" may work the same way as existing CPU share approaches implemented by operating system level workload managers; that is, by defining a relative target entitlement for the allocation of processor time between workloads based on numeric shares that prioritizes processor dispatching when there is competition for processor cycles on a host, and otherwise allows workloads to leverage any spare processor capacity required.

"Hard shares" dynamically impose hard limits on particular workloads on the system. For a workload configured with hard shares, a hard limit is imposed that is equivalent to the current percentage share the workload is entitled to relative to all other workloads currently active on the system. As a result, a workload configured with hard shares is not allowed to exceed its target share based entitlement, even in the presence of spare processor cycles. This ensures that the impacts of high intensity workloads can be controlled in the presence of other workloads. Furthermore, since shares represent a relative configuration of processor time and since the target entitlement will change based on which workloads are running on the system, the hard limit is dynamically adjusted depending on what is running on the system. This ensures that a workload with hard shares will be able to leverage the entire system processor capacity in the absence of other work, and that its CPU limit will be scaled proportionally to its share when other workloads are running on the system.

Figure 2:
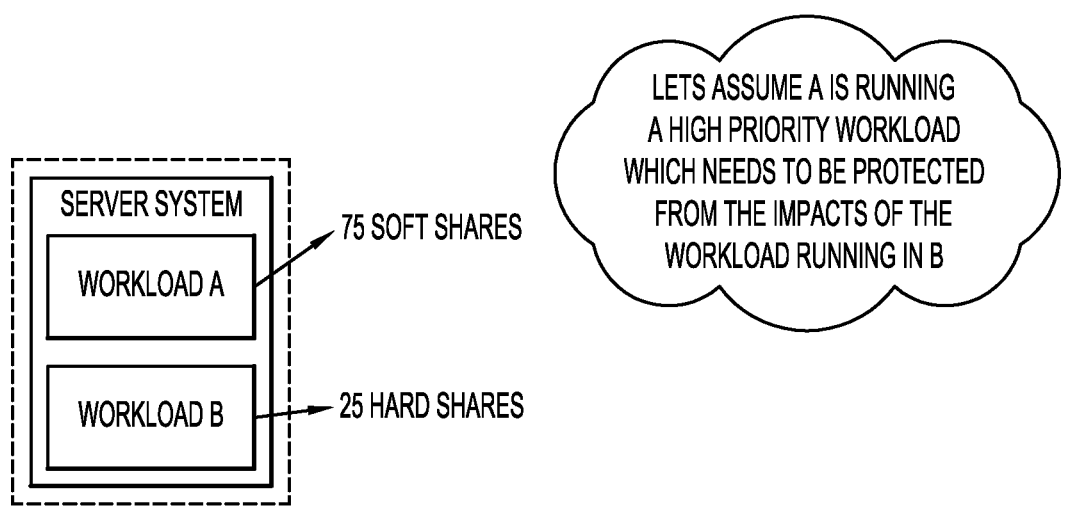
FIG. 2 is an illustration of an example allocation of soft shares and hard shares according to an embodiment of the present invention.
Figure 3:
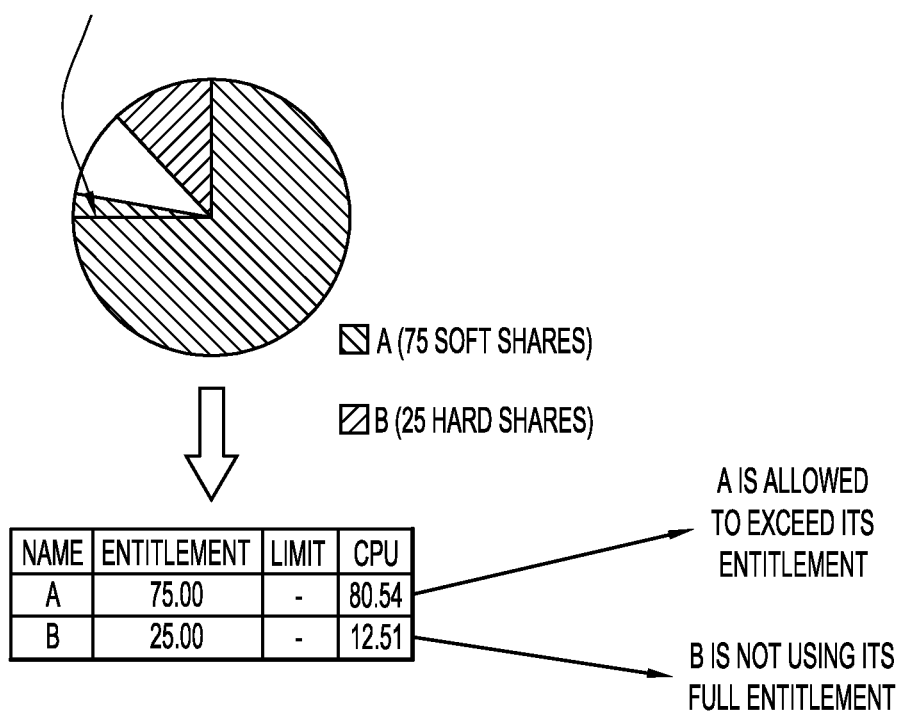
FIG. 3 is an illustration of an example of processor utilization for a workload configured with soft shares when a concurrent workload uses less than its entitled processor allocation according to an embodiment of the present invention.
Figure 4:
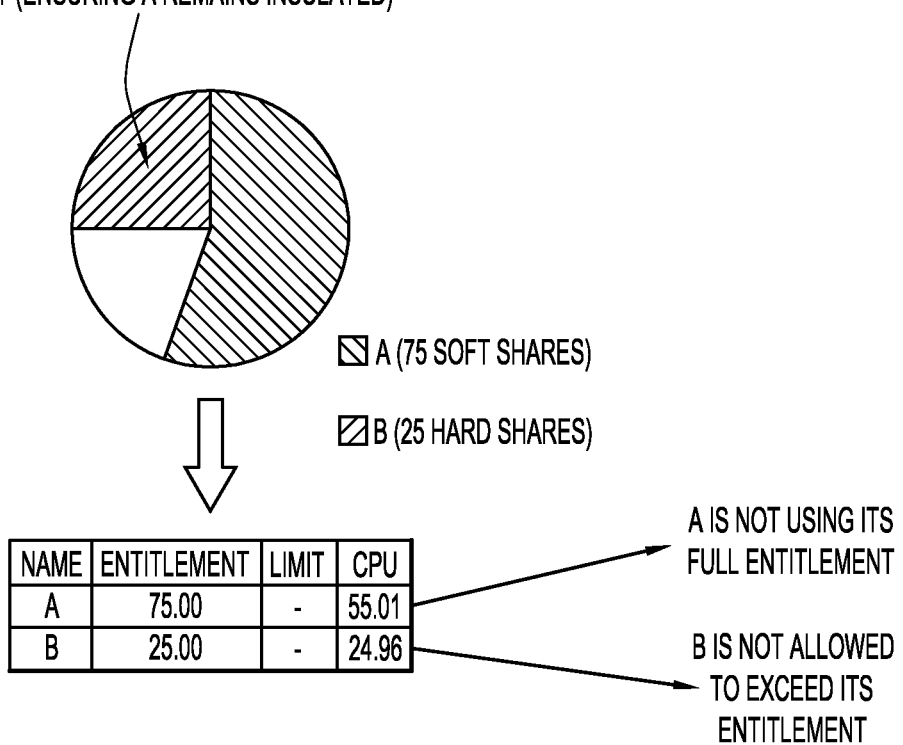
FIG. 4 is an illustration of an example of processor utilization for a workload configured with hard shares when a concurrent workload uses less than its entitled processor allocation according to an embodiment of the present invention.
Figure 5:
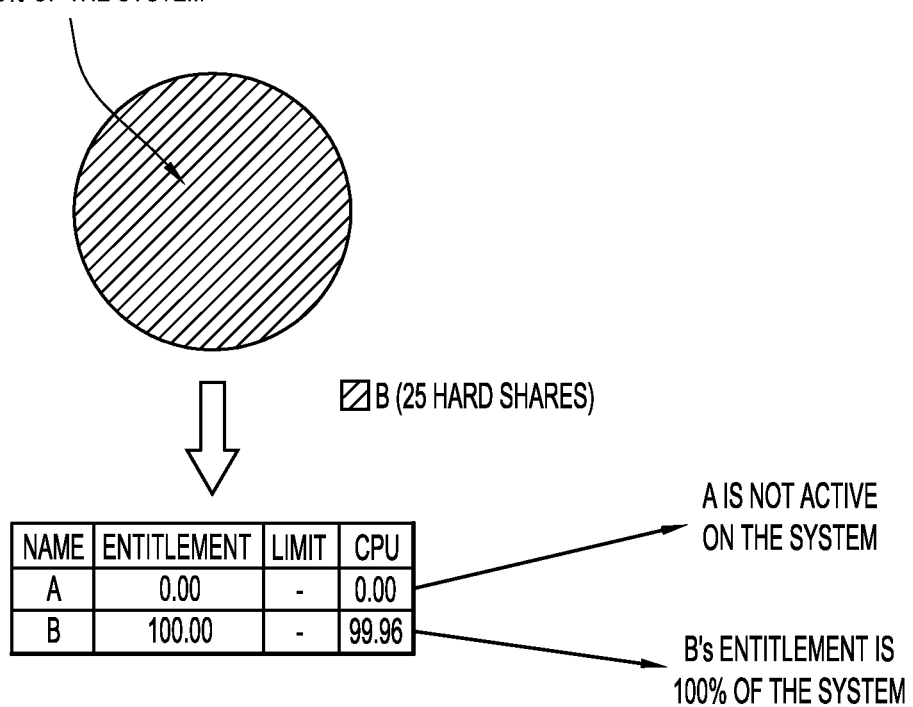
FIG. 5 is an illustration of an example of processor utilization for a workload configured with hard shares when no other workload is active.

An example demonstrates the function of hard shares and soft shares according to an embodiment of the present invention. In this example, a server system is configured for two workloads, Workload A and Workload B, as illustrated in FIG. 2. Workload A is a high priority workload that needs to be protected from the impact of Workload B. Accordingly, Workload A is assigned 75 soft shares, and Workload B is assigned 25 hard shares. As a result, Workloads A and B are entitled to 75% and 25% processor usage respectively when both are active on the server. Soft shares allow Workload A to consume more than its entitlement when spare capacity is available (i.e., when Workload B uses less than its full entitlement). For instance, Workload A may use 80% of the processor time when Workload B is using only 12%, as illustrated in FIG. 3. In contrast, hard shares prevent Workload B from consuming more than its entitlement even when there is spare capacity (ensuring that Workload A remains insulated). For instance, Workload B cannot exceed 25% processor usage even when Workload A uses only 55%, as illustrated in FIG. 4.

One aspect of allowing the configuration of both "soft" and "hard" shares is that high priority workloads can be allowed to utilize any spare processor capacity available beyond their defined entitlement to make faster progress. Another aspect is that intensive workloads can be strictly limited in the presence of other work to ensure they do not impact the response times or expected performance of higher priority work. A further aspect is that since a shares based configuration is relative, hard shares provide a simple mechanism to set up an adaptive hard processor allocation that will adjust based on the different workloads running on the system, without needing to build complex scripting and/or define a complex set of conditional limits for a given environment. The hard processor usage limit is always equivalent to the workload's proportional share of the computer system. As mentioned, this means that in the presence of heavy work, the intensive workload's processor allocation will be scaled back accordingly, while in the absence of other work, the intensive workload will not be throttled unnecessarily.

An embodiment of the present invention may be utilized with an existing system that has the capability of managing processor provisioning for workloads via relative shares and the ability to enforce hard limits on processor usage of those workloads. Such base systems include operating system workload managers that include capabilities for both relative shares and hard limits on processor usage and disk I/O (e.g., AIX WLM) and middleware software systems that incorporate the ability to perform both share based processor scheduling and to impose hard processor usage limits. The configuration of the base system that allows CPU shares to be specified for individual workloads or applications is extended to include an additional attribute that designates the shares as either "soft" or "hard", according to an embodiment of the present invention.

The base system provides metrics on the aggregate processor time consumed by each workload or application running in the system over an arbitrary time period. In the case of an operating system workload manager these metrics would generally be available through a monitoring facility (e.g., wlmstat in AIX WLM) and also internally within operating system control structures. In a middleware system, the CPU time or utilization would be available internally in control structures, as required for the embodiment of the base system that enforces hard limits on processor utilization.

Figure 6:
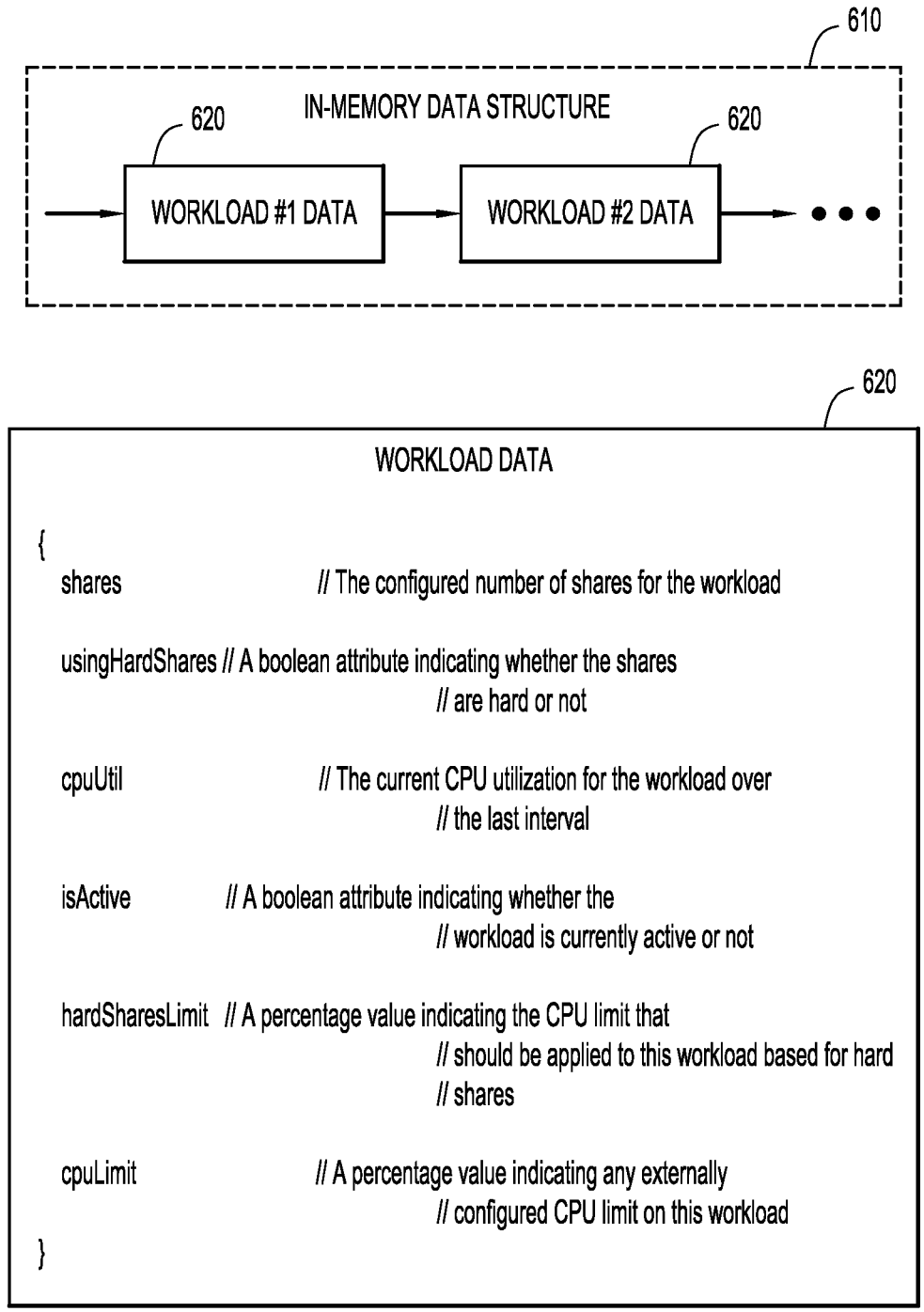
FIG. 6 is an illustration of data structures for storing information used to manage processor allocation according to an embodiment of the present invention.

An in-memory data structure 610 (e.g., a linked list, array, etc.) containing an entry for each workload on the server system is illustrated in FIG. 6. Each workload entry 620 contains, by way of example, the following information: the configured number of shares for the workload ([shares]); a Boolean attribute indicating whether the shares are hard or not ([usingHardShares]); the current CPU utilization for the workload over the last interval ([cpuUtil]); a boolean attribute indicating whether the workload is currently active or not ([isActive]); a percentage value indicating the CPU limit that should be applied to this workload based for hard shares ([hardSharesLimit]); and a percentage value indicating any externally configured CPU limit on this workload ([cpuLimit]).

Figure 7:
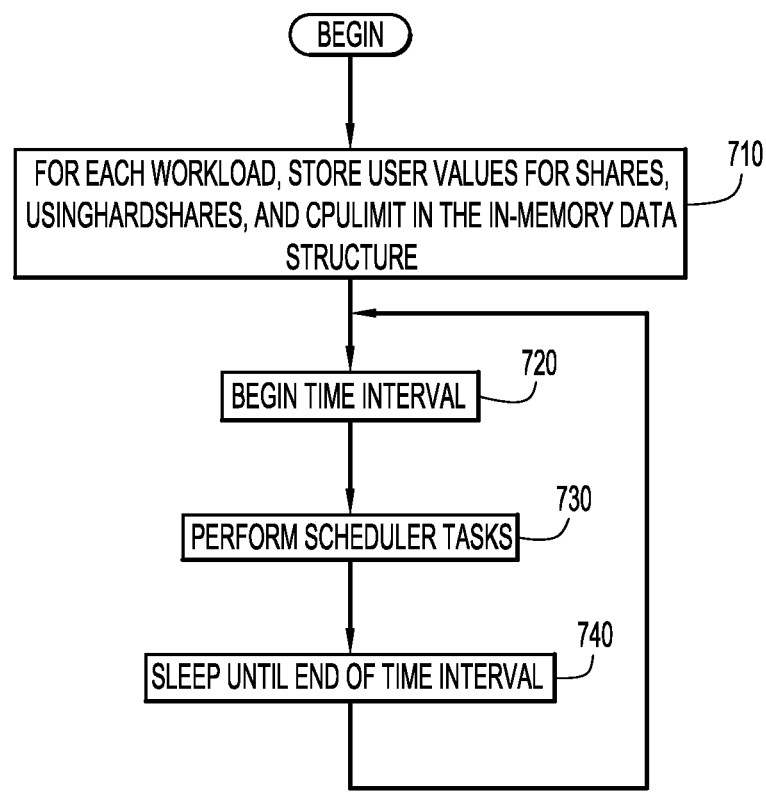
FIG. 7 is a procedural flow chart illustrating a manner in which a scheduler runs at regular intervals according to an embodiment of the present invention.

A manner in which CPU allocation is managed adaptively (e.g., by workload manager 16 via server system 10) according to an embodiment of the present invention is illustrated in FIG. 7. Initially, the system stores the corresponding user configured values for [shares], [usingHardShares], and [cpuLimit] for each workload in the in-memory data structure at step 710. A scheduler thread runs at regular times separated by an interval [T]. At step 720, an interval begins. At step 730, the scheduler performs a set of scheduling and collection tasks (described in detail below) that includes applying dynamically determined hard and soft processor usage limits. The scheduler then sleeps at step 740 until the end of the interval, at which point the process returns to step 720 and the cycle repeats. In a typical embodiment of the present invention, a [T] of 1 second allows the system to adapt fairly quickly to workload changes, without imposing a high degree of overhead on the system.

Figure 8:
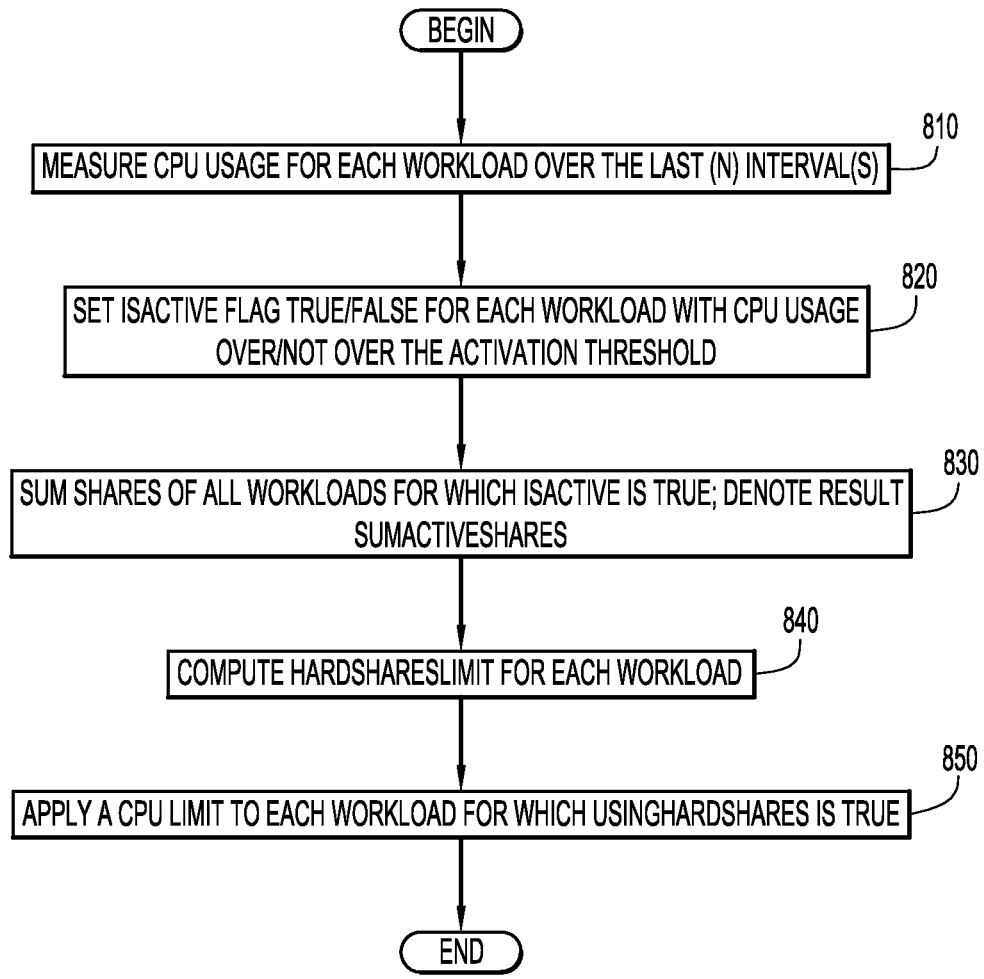
FIG. 8 is a procedural flow chart illustrating a manner in which a scheduler applies processor usage limits for a given time interval according to an embodiment of the present invention.

The set of scheduling tasks performed each interval according to an embodiment of the present invention is illustrated in FIG. 8. At step 810, the scheduler thread collects metrics on the aggregate processor time or processor utilization (e.g., percent of processor capacity) used by all threads doing work on behalf of a particular application or workload since the last collection period. In the case where processor time is the only metric available, the thread will convert the processor time used by each individual workload into a processor utilization metric by dividing it by the total processor time available on the system over that collection interval. The exact calculation will be operating system and/or hardware dependent, and also dependent on whether the system is running under a virtualized environment. Alternatively, the processor utilization may be computed based on metrics collected over the last N intervals, rather than only the most recent interval, as a way to have the system adapt more smoothly to changes in workload. In such cases a moving average may be used to determine the processor utilization compared to the activation threshold discussed below.

At step 820, the scheduler traverses the in-memory data structure and for each workload on the system checks whether the processor utilization over the last collection period exceeds an activation threshold [A]. The activation threshold is used to determine whether a given workload is considered to be "active" over the next scheduling interval. In the case where the processor utilization exceeds the activation threshold, the [is Active] flag is set to true for the workload, otherwise the flag is set to false. The activation threshold may be a user configured value.

At step 830, the scheduler traverses each of the workloads on the system and computes the sum of the shares for all workloads for which [is Active] is true. The sum is denoted [sumActiveShares].

At step 840, the scheduler traverses each of the workloads on the system and computes the applicable [hardSharesLimit] for each workload. The [hardSharesLimit] is set to ([shares]× 100)÷[sumActiveShares] if the [usingHardShares] and [is Active] fields for the workload are true, otherwise the [hardSharesLimit] is set to NONE, representing no limit. Alternative computations of the [hardSharesLimit] may be used for inactive workloads and/or to implement hierarchical workload classes, as described below with respect to FIGS. 9-11.

At step 850, the scheduler traverses each of the workloads on the system and applies a CPU limit via the underlying base system to any workloads having [usingHardShares] marked true. A manner in which the scheduler determines the CPU limit to apply is shown in Table 1 below. In the case where the workload is using both hard shares and an externally configured [cpuLimit], the more restrictive limit will always be respected.

TABLE 1

Determination of applied CPU limit

```
if (cpuLimit)
{
    Applied limit = MIN(hardSharesLimit, cpuLimit);
}
else
{
    Applied limit = hardSharesLimit
}
```

Use of an activation threshold to determine whether a workload will be considered active or not allows the user the additional control required to prevent situations where a small trickle of work in a particular workload would cause it to be considered active, and the relative allocations are altered in an undesired manner. For example, if a small trickle of work in a high priority workload might be expected during a batch window, but the desire is for the batch job to have full usage of the system, the activation threshold could be set at a level such that the expected trickle of work in the high priority workload would not be sufficient for the high priority workload to be considered active. Likewise it might be desirable to set the activation threshold so that occasional administrative tasks would not cause changes in the overall workload CPU allocations on the system.

A manner in which a scheduler computes the applicable [hardSharesLimit] for each workload is shown in FIG. 9. The [hardSharesLimit] for the workload is set to ([shares]×100)÷ [sumActiveShares] if the [usingHardShares] field for the workload is set to true, otherwise the [hardSharesLimit] is set to NONE, indicating no limit. Optionally, if the workload is marked as using [hardSharesLimit] but its [is Active] flag is false, [hardSharesLimit] may be set to a value such as ([shares]×100)÷([sumActiveShares]+[shares]) in order to ensure that if the workload suddenly becomes active it will not consume CPU without limit until the next interval.

In an embodiment of the present invention that allows a hierarchical definition of objects with processor shares—for example, by subdividing the system into a series of service superclasses each with a configured shares value that determines how the overall system processor time is divided, and then subdividing each superclass into a set of subclasses each with a configured shares value that determines how the processor time assigned to the superclass is subdivided amongst individual subclasses—the computation of the hard shares limit is modified as follows. At step 830 (FIG. 8), the [shares] of all active superclasses are summed (the result is denoted [sumActiveSuperclassShares]), and, for each superclass, the [shares] of all active subclasses are summed (the results are denoted [sumActiveSubclassShares]). At step 840, a [hardSharesLimit] is computed for each service superclass using [sumActiveSuperlcassShares] in place of [sumActiveShares] as shown in FIG. 10. In addition, a hard shares limit is computed for each subclass based on the percentage entitlement of the subclass compared to the other active subclasses in the same superclass, as a percentage of the greater of either the entitled processor utilization of the parent superclass, or the actual processor utilization of the parent superclass (which might be larger if the superclass is configured with soft shares), as shown in FIG. 11. Specifically, if a subclass is marked with [usingHardShares] true and is active or its parent class is active, its [hardSharesLimit] is set to ((([shares]×100) ÷[sumActiveSubclassShares])×MAX(x,y)÷100, where MAX(x,y) denotes the greater of x and y, x is the [cpuUtil] of the parent superclass, and y is the entitled processor utilization of the parent superclass based on its shares, which is equal to the [shares] of the parent superclass×100÷[sumActiveSuperclassShares]. Optionally, if neither the subclass nor its parent class is active, a [hardSharesLimit] for the subclass may be computed based on y=([shares] of parent superclass× 100)÷([sumActiveSuperclassShares]+[shares] of parent superclass).

It will be appreciated that the embodiments described above and illustrated in the drawings represent only a few of the many ways of implementing embodiments for adaptive resource usage limits for workload management.

The managed resource may be any resource of a computer system running a number of workloads (e.g., processor time, network time, I/O, etc.). It will be apparent to someone familiar with workload management that an embodiment of the present invention may manage allocation of network time and I/O time in substantially the same manner as processor time.

The topology or environment of the present invention embodiments may include any number of computer or other processing systems (e.g., client or end-user systems, server systems, etc.) arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., IBM-compatible, laptop, PDA, mobile devices, etc.) having any number of processors, and may include any commercially available operating system and any commercially available or custom software (e.g., workload application software, workload management software, communications software, server software, database software, etc.). These systems may include any types of monitors and input devices (e.g., keyboard, mouse, voice recognition, touch screen, etc.) to enter and/or view information.

It is to be understood that the software (e.g. workload management software, workload application software, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices including third party client/server processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., base workload management software, custom workload management software, workload application software, etc.) may be available on a computer useable or recordable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any types of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other data stores, storage structures (e.g., arrays, linked lists, trees, databases, data structures, etc.), or storage media to store information (e.g., business content, metadata, workload manager configuration parameters, processor usage metrics, etc.). The database systems may be implemented by any number of any conventional or other databases or data structures to store information.

The present invention embodiments are not limited to the specific tasks, algorithms, or network/environment described above, but may be utilized for managing workloads of any type (e.g., database applications, web services, etc.).

Shares assigned to workloads (e.g., the values of [share] fields) may be represented using any numerical scale (e.g., [0.0-1.0], [0-1000], [−inf, inf], etc.). Any function may be used to map hard and soft shares to any combination of hard and soft limits or targets for processor time allocation (e.g., fraction of total active shares may map linearly to a hard limit on the percentage of processor utilization for a workload configured with hard shares, the mapping may be non-linear, the mapping may depend on additional parameters, etc.). Limits and targets for processor utilization may be represented in any units (e.g. fraction of capacity, percentage of capacity, time, etc.). Any number of workloads may be configured with hard and/or soft shares. Any number of workloads may be assigned to any classes, hierarchies of classes, or other sets of classes having any relationships. Classes of workloads may use any weighting or functions of shares or other parameters in computing processor usage targets and limits.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. As a specific example, scheduler tasks (FIG. 8) may be consolidated in order to optimize the processing and/or reduce the number of traversals made of data structure 610 (FIG. 6). As another example, the scheduler tasks may be performed according to any periodic or pseudo-periodic schedule (FIG. 7) (e.g., the system may sleep for an interval that begins upon completion of the scheduler tasks).

It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for allocating a resource to workloads comprising:
    at least one processor configured to:
        assign workloads corresponding share quantities of the resource, wherein the share quantity of at least one of the workloads is a hard share quantity, and each share quantity other than a hard share quantity is a soft share quantity;
        allocate the resource to currently active workloads in a current interval based on share quantities of previously active workloads in a preceding predefined interval by determining for each of said previously active workloads a portion of the resource to which the previously active workload is entitled in the current interval based on the share quantity of that previously active workload relative to the share quantities of other previously active workloads in the preceding predefined interval; and
        in response to the availability of additional resource amounts of the resource in the current interval, allocating the additional resource amounts to at least one of the currently active workloads assigned a soft share quantity in the current interval.

2. The system of claim 1, wherein the resource is processor time.

3. The system of claim 2, wherein a workload is active in an interval when the workload has a processor utilization that exceeds a minimum threshold for said interval, and said processor utilization for said interval is an average of processor utilization for one or more sub-intervals of said interval.

4. The system of claim 1, wherein said allocating said resource to said currently active workloads recurs according to a regular schedule.

5. The system of claim 1, wherein said portion of the resource to which a previously active workload was entitled is proportional to said hard share quantity of said previously active workload divided by a sum of said hard share quantity and said soft share quantity of said other previously active workloads in said preceding predefined interval.

6. The system of claim 1, wherein a portion of the resource to which one or more previously active workloads was entitled is determined for one or more previously inactive workloads in said preceding predefined interval based on a hard share quantity assigned to one or more other previously inactive workloads in the preceding predefined interval.

7. The system of claim 1, wherein said portion of the resource to which a previously active workloads was entitled may not exceed a predetermined limit.

8. The system of claim 1, wherein: at least one workload is a member of a class of workloads, and allocating said resource to said workload comprises determining a maximum resource allocation for the workload based on a resource entitlement of the class and a hard share quantity indicating a maximum allocation of the resource entitlement of the class to the workload.

9. A computer program product comprising:
   a non-transitory computer readable storage medium having computer readable program code embodied therewith for execution on a first processing system, the computer readable program code comprising computer readable program code configured to:
   assign workloads corresponding share quantities of the resource, wherein the share quantity of at least one of the workloads is a hard share quantity, and each share quantity other than a hard share quantity is a soft share quantity;
   allocate the resource to currently active workloads in a current interval based on share quantities of previously active workloads in a preceding predefined interval by determining for each of said previously active workloads a portion of the resource to which the previously active workload is entitled in the current interval based on the share quantity of that previously active workload relative to the share quantities of other previously active workloads in the preceding predefined interval; and
   in response to the availability of additional resource amounts of the resource in the current interval, allocating the additional resource amounts to at least one of the currently active workloads assigned a soft share quantity in the current interval.

10. The computer program product of claim 9, wherein the resource is processor time.

11. The computer program product of claim 10, wherein a workload is active in an interval when the workload has a processor utilization that exceeds a minimum threshold for said interval, and said processor utilization for said interval is an average of processor utilization for one or more sub-intervals of said interval.

12. The computer program product of claim 9, wherein said allocating said resource to said currently active workloads recurs according to a regular schedule.

13. The computer program product of claim 9, wherein said portion of the resource to which a previously active workload was entitled is proportional to said hard share quantity of said previously active workload divided by a sum of said hard share quantity and said soft share quantity of said other previously active workloads in said preceding predefined interval.

14. The computer program product of claim 9, wherein a maximum resource allocation is determined for one or more previously inactive workloads in said preceding predefined interval based on a hard share quantity assigned to said one or more other previously inactive workloads.

15. The computer program product of claim 9, wherein said portion of the resource to which a previously active workloads was entitled may not exceed a predetermined limit.

16. The computer program product of claim 9, wherein: at least one workload is a member of a class of workloads, and allocating said resource to said workload comprises determining a maximum resource allocation for the workload based on a resource entitlement of the class and a hard share quantity indicating a maximum allocation of the resource entitlement of the class to the workload.

* * * * *